(12) United States Patent
Qi et al.

(10) Patent No.: US 9,272,247 B2
(45) Date of Patent: Mar. 1, 2016

(54) POLYIMIDE MEMBRANES

(75) Inventors: Yu Qi, Oakville (CA); Sandra J. Gardner, Oakville (CA); Qi Zhang, Milton (CA); Carolyn P. Moorlag, Mississauga (CA); Brynn M. Dooley, Toronto (CA); Guiqin Song, Milton (CA); Nicoleta D. Mihai, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 783 days.

(21) Appl. No.: 13/444,366

(22) Filed: Apr. 11, 2012

(65) Prior Publication Data
US 2013/0270179 A1 Oct. 17, 2013

(51) Int. Cl.
B01D 53/22 (2006.01)
B01D 71/64 (2006.01)
B01D 67/00 (2006.01)
B01D 71/32 (2006.01)

(52) U.S. Cl.
CPC ............ B01D 71/64 (2013.01); B01D 67/0004 (2013.01); B01D 71/32 (2013.01); B01D 2323/39 (2013.01); B01D 2325/38 (2013.01)

(58) Field of Classification Search
CPC ............... B01D 71/64; B01D 2323/39; B01D 2239/0216; B82Y 39/00; D01D 5/0007
USPC ......... 210/500.4; 438/687, 637; 257/576, 579
See application file for complete search history.

(56) References Cited

U.S. PATENT DOCUMENTS

| | | | |
|---|---|---|---|
| 4,887,340 A | 12/1989 | Kato et al. | |
| 5,421,450 A | 6/1995 | Kitagawa et al. | |
| 6,228,448 B1 | 5/2001 | Ndebi et al. | |
| 6,419,839 B1 * | 7/2002 | Cox | B01D 39/163 210/167.11 |
| 6,709,992 B1 | 3/2004 | Swift et al. | |
| 8,066,366 B2 | 11/2011 | Fioravanti et al. | |
| 8,105,682 B2 * | 1/2012 | Sun | D01F 2/28 428/292.1 |
| 2002/0100725 A1 * | 8/2002 | Lee | B01D 39/1623 210/503 |
| 2003/0224235 A1 * | 12/2003 | Park | H01M 8/1023 429/492 |
| 2004/0247808 A1 * | 12/2004 | Cooper | B01D 67/0072 428/36.1 |
| 2005/0080184 A1 * | 4/2005 | Hajek et al. | 524/492 |
| 2005/0160711 A1 * | 7/2005 | Yang | B01D 39/1623 55/524 |
| 2006/0207234 A1 * | 9/2006 | Ward et al. | 55/524 |
| 2008/0187996 A1 * | 8/2008 | Baca | A61L 27/06 435/396 |
| 2008/0314010 A1 * | 12/2008 | Smithies et al. | 55/498 |
| 2008/0315464 A1 * | 12/2008 | Smithies et al. | 264/454 |
| 2009/0032475 A1 * | 2/2009 | Ferrer et al. | 210/799 |
| 2009/0042029 A1 | 2/2009 | Havel et al. | |

(Continued)

FOREIGN PATENT DOCUMENTS

JP 4108524 * 4/1992
WO WO 2011149241 A2 * 12/2011 ............ 210/650

OTHER PUBLICATIONS

Superhydrophobic and Oleophobic Fibers by Coaxial Electrospinning by Han.*

(Continued)

*Primary Examiner* — Krishnan S Menon
*Assistant Examiner* — Waqaas Ali
(74) *Attorney, Agent, or Firm* — Hoffman Warnick LLC

(57) ABSTRACT

There is provided a membrane that includes a plurality of polyimide fibers encased in a fluoropolymer sheath, the plurality of fibers having a diameter of from about 10 nm to about 50 microns, wherein the plurality of fibers form a permeable non-woven mat. A method of manufacturing the membrane is provided.

12 Claims, 3 Drawing Sheets

(56) References Cited

U.S. PATENT DOCUMENTS

| | | | |
|---|---|---|---|
| 2009/0277837 A1* | 11/2009 | Liu et al. | 210/650 |
| 2010/0297906 A1* | 11/2010 | Steckl et al. | 442/347 |
| 2011/0025752 A1 | 2/2011 | Law et al. | |
| 2012/0077406 A1* | 3/2012 | Scrivens | D04H 1/413 442/351 |
| 2012/0156481 A1 | 6/2012 | Moorlag et al. | |
| 2012/0225602 A1 | 9/2012 | Qi et al. | |

OTHER PUBLICATIONS

"Preparation of ultrafine uniform electrospun polyimide nanofiber" by Fukushima.*

Ghard.com; http://www.gharda.com/products/new_product_pdfs/6-FDA_TFDB.pdf. Apr. 10, 2010.*

U.S. Appl. No. 13/040,568, Office Action dated Apr. 22, 2013.

U.S. Appl. No. 13/040,568, XRX-0072, Office Action dated Oct. 17, 2013, 12 pages.

U.S. Appl. No. 13/040,568, Office Action dated Mar. 4, 2011.

U.S. Appl. No. 13/040,568, Office Action dated Jul. 17, 2012.

U.S. Appl. No. 13/040,568, Office Action dated Sep. 27, 2012.

Fukushima et al., "Preparation of ultrafine uniform electrospun polyimide nanofiber", Polymer Journal, 2010, 42, 514-518.

U.S. Appl. No. 13/040,568, Office Action, May 7, 2014, 12 pages.

U.S. Appl. No. 13/706,027, Office Action 1 dated Jul. 16, 2015, (XRX-0087), 54 pgs.

* cited by examiner

POLYIMIDE MEMBRANES

BACKGROUND

There is a desire to develop high performance oleophobic membranes that are robust and can be operated at high temperature. The oleophobic membrane finds uses for liquid separation and venting in many industries. The membrane products currently available in the market are unable to provide sustained performance as the material degrades at the operational temperature.

One use of oleophobic membranes at elevated temperatures is disclosed in U.S. Pat. No. 8,066,366, incorporated in its entirety by reference herein. In U.S. Pat. No. 8,066,366 a containment membrane is used to regulate the supply of release agent in a release agent applicator.

Porous membranes are used to remove gas bubbles in microfluidic channels. Bubbles in microfluidic channels are associated with clogged channels and reduced dynamic performance. The removal of bubbles is accomplished by positioning a hydrophobic membrane on top of a microchannel.

A membrane having oleophobic characterstics and operable at elevated temperatures is desired.

SUMMARY

Embodiments include a membrane comprising a plurality of polyimide fibers encased in a fluoropolymer sheath, the plurality of fibers having a diameter of from about 10 nm to about 50 microns, wherein the plurality of fibers form a permeable mat.

Embodiments include a membrane comprising a plurality of fluorinated polyimide fibers encased in a fluoroelastomeric sheath, the plurality of fibers having a diameter of from about 10 nm to about 50 microns, wherein the plurality of fibers form a permeable mat. The mat has an oil contact angle of larger than about 90 degrees at a temperature above about 100° C.

Embodiments include a membrane comprising a plurality of fluorinated polyimide fibers encased in a fluoroplastic sheath, the plurality of fibers having a diameter of from about 10 nm to about 50 microns, wherein the plurality of fibers form a permeable mat. The mat has an oil contact angle of larger than about 90 degrees at a temperature above about 100° C.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
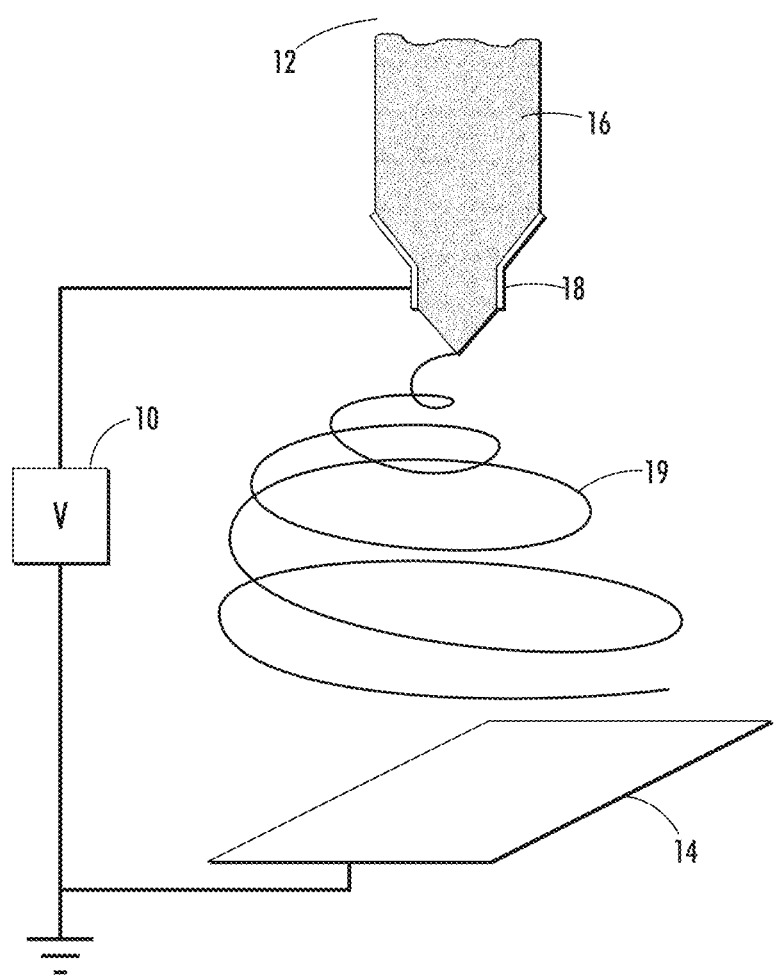
FIG. 1 is a schematic of an electrospinning apparatus.

It should be noted that some details of the figures have been simplified and are drawn to facilitate understanding of the embodiments rather than to maintain strict structural accuracy, detail, and scale.

DETAILED DESCRIPTION

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. $-1, -2, -3, -10, -20, -30$, etc.

As used herein, the term "hydrophobic/hydrophobicity" and the term "oleophobic/oleophobicity" refer to the wettability behavior of a surface that has, e.g., a water and hexadecane (or hydrocarbons, silicone oils, etc.) contact angle of approximately 90° or more, respectively. For example, on a hydrophobic/oleophobic surface, a ~10-15 µL water/hexadecane drop can bead up and have an equilibrium contact angle of approximately 90° or greater.

As used herein, the term "ultrahydrophobicity/ultrahydrophobic surface" and the term "ultraoleophobic/ultraoleophobicity" refer to wettability of a surface that has a more restrictive type of hydrophobicity and oleophobicity, respectively. For example, the ultrahydrophobic/ultraoleophobic surface can have a water/hexadecane contact angle of about 90° or greater.

In addition, the term "superhydrophobicity/superhydrophobic surface" and the term "superoleophobic/superoleophobicity" refer to wettability of a surface that has a even more restrictive type of hydrophobicity and oleophobicity, respectively. For example, a superhydrophobic/superoleophobic surface can have a water/hexadecane contact angle of approximately 150 degrees or greater and have a ~10-15 µL water/hexadecane drop roll freely on the surface tilted a few degrees from level. The sliding angle of the water/hexadecane drop on a superhydrophobic/superoleophobic surface can be about 10 degrees or less. On a tilted superhydrophobic/superoleophobic surface, since the contact angle of the receding surface is high and since the interface tendency of the uphill side of the drop to stick to the solid surface is low, gravity can overcome the resistance of the drop to slide on the surface. A superhydrophobic/superoleophobic surface can be described as having a very low hysteresis between advancing and receding contact angles (e.g., 40 degrees or less). Note that larger drops can be more affected by gravity and can tend to slide easier, whereas smaller drops can tend to be more likely to remain stationary or in place.

Disclosed herein are high performance oleophobic polyimide membranes and their method of manufacture. Aromatic polyimides are high performance polymers known for their high mechanical strength, high thermal stability, and chemical resistance. The membrane, in one embodiment, is made from fluorinated polyimide (FPI) fibers followed by fluoropolymer treatment. In embodiments, the membrane can be manufactured from FPI/fluoropolymer core-sheath fibers and spun into non-woven fabric mats. More specifically, the membrane uses polyimide fibers having a range of sizes. In embodiments, the fibers are from about 10 nanometers to about 50 micrometers in diameter, or from about 50 nanometers to about 20 micrometers in diameter, or from about 100 nanometers to about 10 micrometers in diameter. The membranes can be made by electrospinning the FPI fibers.

The polyimide membrane has high surface area and porosity. The pore size of the membrane is from about 5 nm to about 50 μm, or from about 50 nm to about 10 μm, or from about 100 nm to about 1 μm.

The polyimide membrane has a thickness of from about 5 μm to about 5 mm, or in embodiments from about 10 μm to about 1 mm, or in embodiments from about 50 μm to about 500 μm.

The polyimide membrane has an oil contact angle greater than about 90 degrees, or greater than about 100 degrees, or greater than about 110 degrees, at a temperature of above 100° C.

The fiber mat of the polyimide membrane has a modulus of from about 5 kpsi to about 100 kpsi, or in embodiments from about 10 kpsi to about 80 kpsi, or in embodiments from about 20 kpsi to about 60 kpsi.

The fiber mat of the polyimide membrane has a tensile strength of from about 400 psi to about 1500 psi, or in embodiments from about 450 psi to about 1300 psi, or in embodiments from about 500 psi to about 1200 psi.

The polyimide membrane has a strain of from about 10 percent to about 100 percent, or in embodiments from about 20 percent to about 60 percent, or in embodiments from about 30 percent to about 50 percent.

Providing a membrane of FPI fibers having fluoropolymer coating produces a fabric mat having a low surface energy. The FPI/fluoropolymer fiber mats possess superhydrophobicity with dynamic behaviour of water droplets and sustained oleophobicity at elevated temperatures (e.g. stable paraffin oil drop at 150° C. for days). Oil contact angles were in range of about 90 to about 130 degrees at 100° C. for the FPI/fluoropolymer fiber mats.

Fluorinated polyimides are high performance polymers that offer chemical and thermal stability. Tunable mechanical, physical and/or chemical properties may be achieved by adjusting the component ratio of the relatively stiff aromatic segment and relatively soft fluorinated aliphatic segment. Reactive sites may be introduced to accommodate the site for curing and/or crosslinking. The polyimide can be prepared by known reactions, namely polycondensation between aromatic dianhydrides and diamines. By properly tailoring the structure, the resulting polyimide can possess the desired properties.

High performance oleophobic membranes can be manufactured by synthesizing fluorinated polyimides (FPI). The FPIs are electrospun to form a FPI fabric mat. The surface of the FPI fabric mat is subsequently coated with fluoropolymers and heated to cure the fluoropolymers. The fluoropolymers have a curing temperature of from about 150° C. to about 360° C. or from about 280° C. to about 330° C.

In an embodiment high performance oleophobic membranes can be prepared by co-axial electrospinning of FPI and fluoropolymer (such as Viton) to form the fabrics with FPI core fibers covered with fluoropolymer sheath.

Both methods of producing FPI/fluoropolymer membranes or mats use the same electrospinning equipment. Electrospinning uses an electrical charge to draw very fine (typically on the micro or nano scale) fibers from a liquid. The charge is provided by voltage source 10. The process does not require the use of coagulation chemistry or high temperatures to produce solid threads from solution. This makes the process particularly suited to the production of fibers using large and complex molecules such as polymers. When a sufficiently high voltage is applied to a liquid droplet, the body of the liquid becomes charged, and electrostatic repulsion counteracts the surface tension and the droplet is stretched. At a critical point a stream of liquid erupts from the surface. This point of eruption is known as the Taylor cone. If the molecular cohesion of the liquid is sufficiently high, stream breakup does not occur and a charged liquid jet is formed.

FIG. 1 is a simplified diagram of an electrospinning apparatus. The standard setup for electrospinning consists of a spinneret 12 (typically a hypodermic syringe needle) connected to a high-voltage (5 to 50 kV) direct current power supply 10, a syringe pump (not shown), and a grounded collector 14. A polymer solution 16 or melt is loaded into the syringe and this liquid is extruded from the needle tip 18 at a constant rate by a syringe pump.

As the liquid jet 19 dries in flight, the mode of current flow changes from ohmic to convective as the charge migrates to the surface of the fiber. The jet 19 is then elongated by a whipping process caused by electrostatic repulsion initiated at small bends in the fiber, until it is finally deposited on a grounded collector 14. The elongation and thinning of the fiber 19 resulting from this bending instability leads to the formation of uniform fibers with nanometer-scale diameters. Suitable equipment is available from Linari Engineering.

When electrospinning the FPI and fluoropolymer simultaneously the needle tip 18 is configured to coat the outside of the FPI liquid with the fluoropolymer liquid.

Fluorinated polyimides (FPI) are synthesized in high molecular weight using a known procedure as shown in Equation 1.

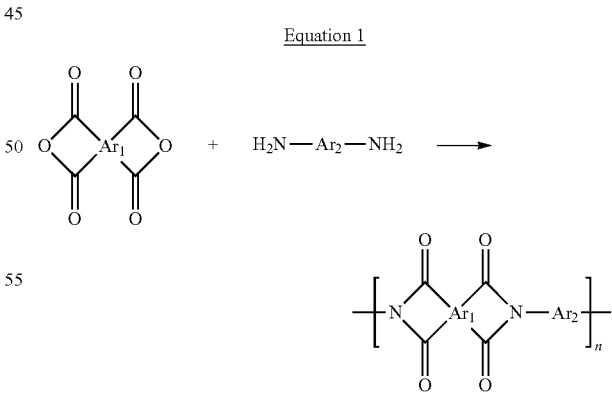

Equation 1 wherein one of wherein $Ar_1$ and $Ar_2$ independently represent an aromatic group of from about 4 carbon atoms to about 60 carbon atoms; and at least one of $Ar_1$ and $Ar_2$ further contains fluorine.

More specific examples of fluorinated polyimides include the following general formula:

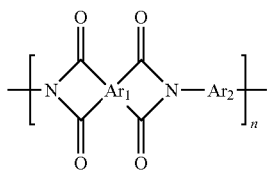

wherein $Ar_1$ and $Ar_2$ independently represent an aromatic group of from about 4 carbon atoms to about 100 carbon atoms, or from about 5 to about 60 carbon atoms, or from about 6 to about 30 carbon atoms such as such as phenyl, naphthyl, perylenyl, thiophenyl, oxazolyl; and at least one of $Ar_1$ and $Ar_2$ further contains a fluoro-pendant group, and the fluorinated polyimide includes an active site capable of reacting with the curing agent. In the polyimide above, n is from about 30 to about 500, or from about 40 to about 450 or from about 50 to about 400.

$Ar_1$ and $Ar_2$ can represent a fluoroalkyl having from about 4 carbon atoms to about 100 carbon atoms, or from about 5 carbon atoms to about 60 carbon atoms, or from about 6 to about 30 carbon atoms. In addition, $Ar_1$ and $Ar_2$ can include the active site on of the fluorinated polyimide.

Examples of aromatic $Ar_1$ include

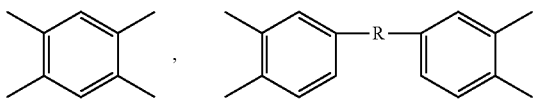

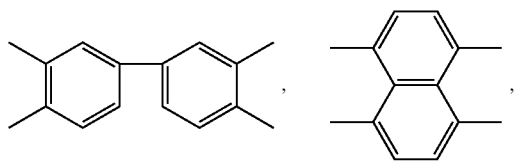

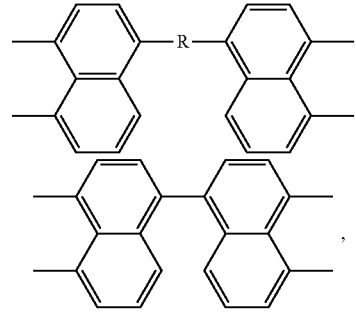

and their fluorinated or perfluorinated analogs, and mixtures thereof. R is a linkage group selected from the group consisting of hexafluoromethylisopropylidene, a sulfur group, an oxy group, a carbonyl group, and a sulfonyl group.

Examples of aromatic $Ar_2$ groups include

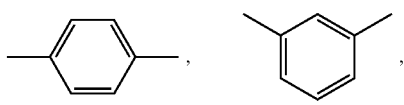

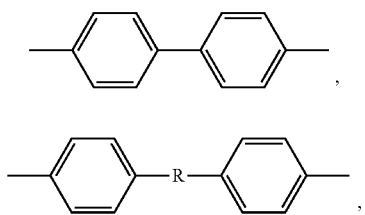

and their fluorinated and perfluorinated analogs, and mixtures thereof. R is a linkage group selected from the group consisting of hexafluoromethylisopropylidene, a sulfur group, an oxy group, a carbonyl group, and a sulfonyl group.

The fluoro-pendant groups include —$C_mH_{2m}C_nF_{(2n+1)}$, —$C_nF_{(2n+1)}$,

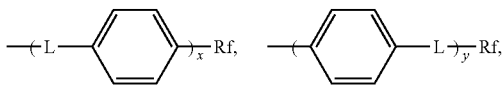

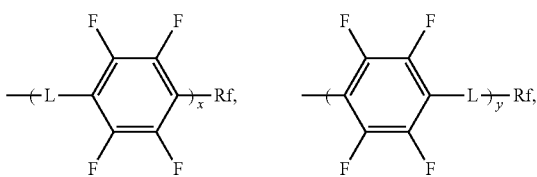

and the mixture thereof. Rf represents fluorine, and a fluorinated aliphatic hydrocarbon group from about 1 carbon atom to about 18 carbon atoms, or from about _carbon atoms to about _carbon atoms, or from about 6 to about 8 carbon atoms such as —$CF_3$, —$CF_2CF_3$, —$CF_2CF_2CF_3$, —$CF_2CF_2CF_2CF_2CF_2CF_3$, and the like; L represents linkage group including hexafluoromethylisopropylidene, a sulfur group, an oxy group, a carbonyl group, or a sulfonyl group, m and n are integers independently selected from about 1 to about 18, or from about 3 carbon atoms to about 16 carbon atoms, or from about 6 to about 12 carbon atoms, x and y are numbers independently selected from about 1 to about 5.

The active site includes

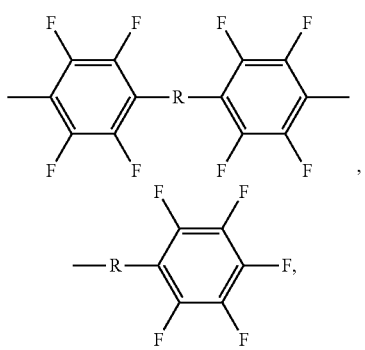

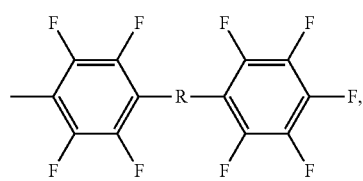

and mixtures thereof, wherein one of the F serves as the active site. R is a linkage group including hexafluoromethylisopropylidene, a sulfur group, an oxy group, a carbonyl group, or a sulfonyl group.; and X is an alkyl group or fluorinated alkyl group of from 1 carbon atom to 18 carbon atoms, or from about 3 carbon atoms to about 12 carbon atoms, or from about 6 to about 8 carbon atoms. The active site can be part of $Ar_1$ or $Ar_2$.

The crosslinked fluorinated polyimide results from a nucleophilic reaction at the active site of the segment with the curing agent such as a bisphenol, a diamine, an aminosilane or a phenolsilane. More specifically, the crosslinking agent includes HO—⟨phenyl⟩—$L_1$—⟨phenyl⟩—OH,  $H_2N$—$L_2$—$NH_2$, $H_2N$—$L_3$—$SiR_p(OR')_{3-p}$,  HO—⟨phenyl⟩—$L_4$—$SiR_p(OR')_{3-p}$, or mixtures thereof, wherein $L_1$ is a linkage group including hexafluoromethylisopropylidene, isopropylidene, methylene, a sulfonyl group, a sulfur group, an oxy group, or a carbonyl group; $L_2$ is a linkage group including an alkylene group from 1 carbon atoms to about 18 carbon atoms, or from about 3 carbon atoms to about 16 carbon atoms, or from about 6 to about 12 carbon atoms or an aromatic hydrocarbon group from 6 to about 30 carbon atoms, or from about 8 carbon atoms to about 24 carbon atoms, or from about 12 to about 18 carbon atoms; $L_3$ is a linkage group including an alkylene group from 1 to about 6 carbon atoms or —$CH_2CH_2$—NH—$CH_2CH_2CH_2$—, $L_4$ is a linkage group including an alkylene group from 1 carbon atoms to about 18 carbon atoms, or from about 3 carbon atoms to about 16 carbon atoms, or from about 6 to about 12 carbon atoms or an aromatic hydrocarbon group from 6 carbon atoms to about 30 carbon atoms, and R represent an alkyl group including methyl, ethyl, propyl, butyl, isopropyl, isobutyl, and p is an integer of from 0 to 2.

In embodiments, the fluorinated polyimide may have the following formula;

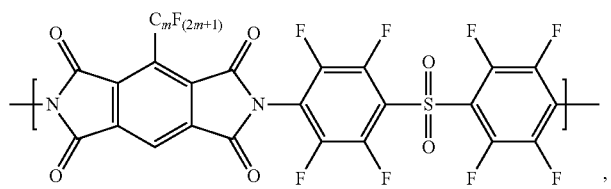

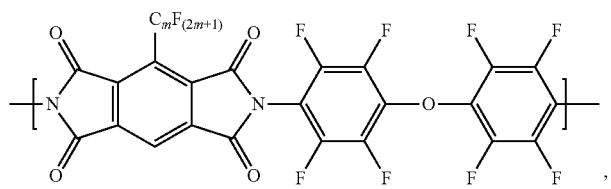

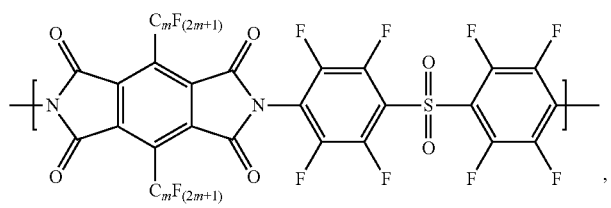

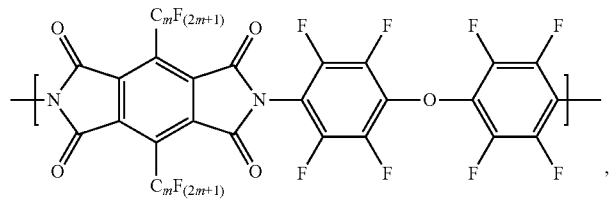
,
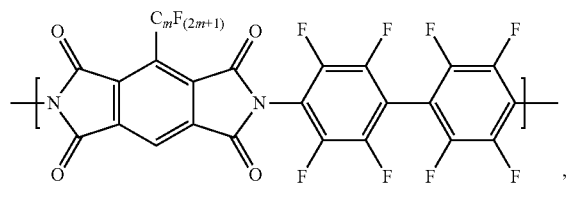
,
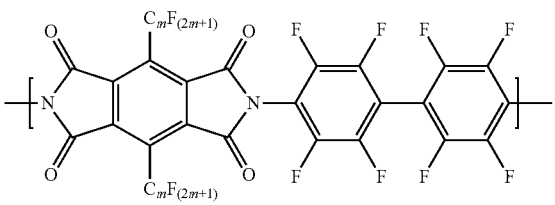
,
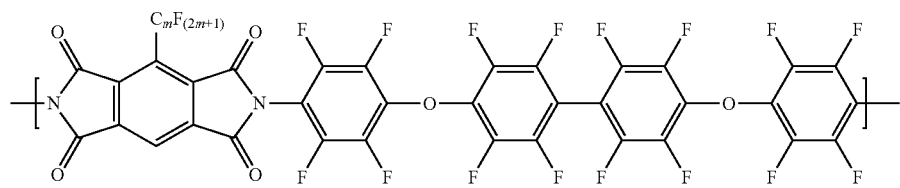
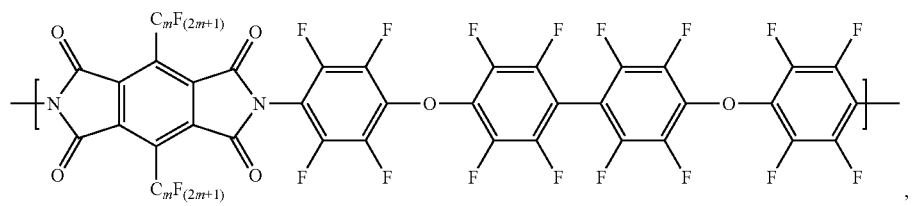
,
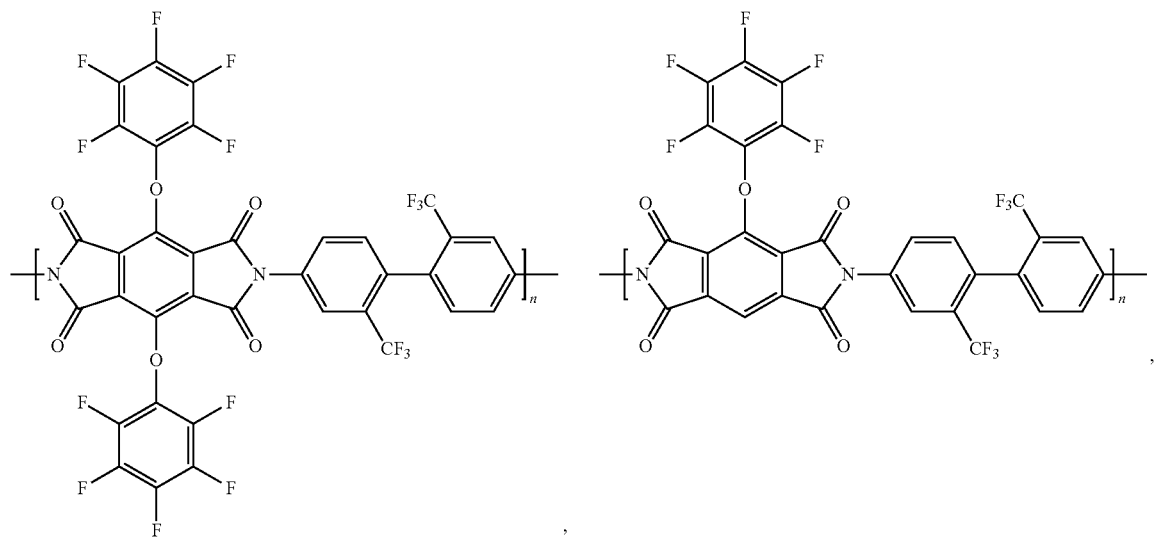
,

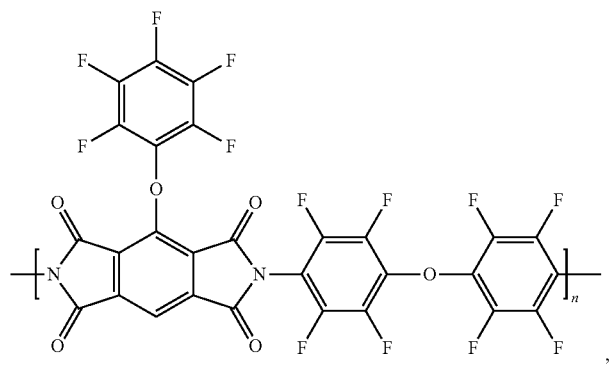,
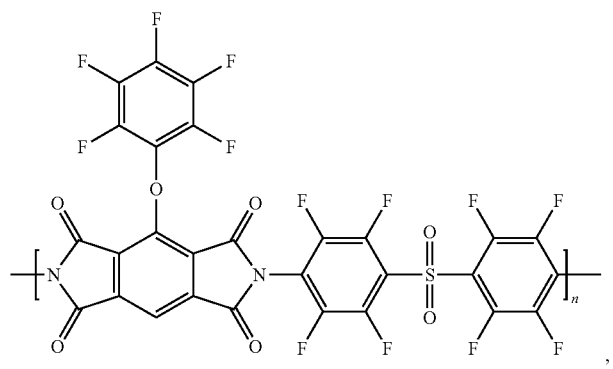,
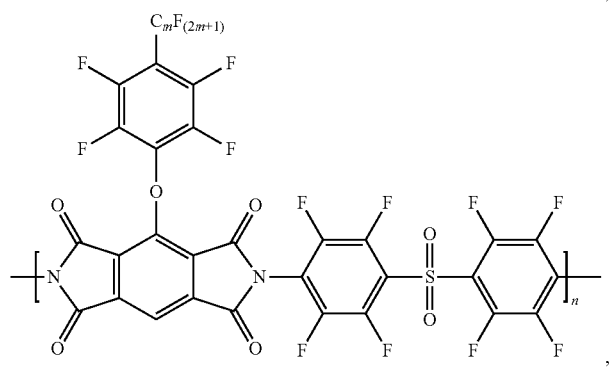,
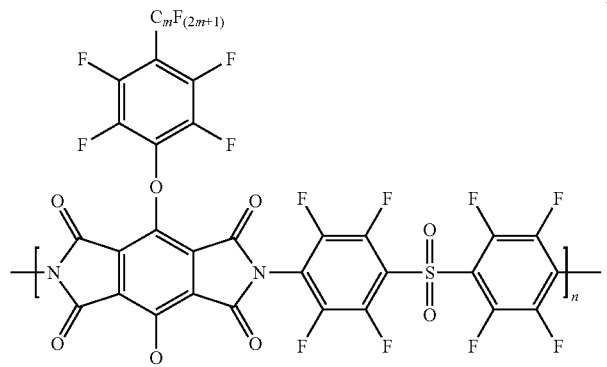,
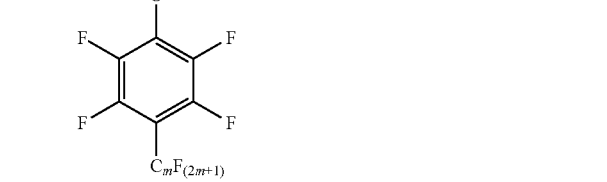

and mixtures thereof, wherein m is an integer of from 1 to about 18, or from about 3 carbon atoms to about 16 carbon atoms, or from about 6 to about 12 carbon atoms. In the formalae above, n is a repeating unit ranging from about 30 to about 500.
In embodiments, the crosslinked product comprises a structural formula selected from the group consisting of
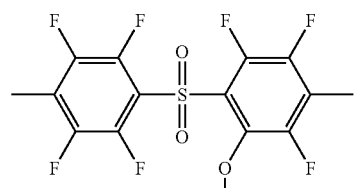
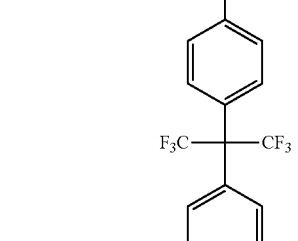
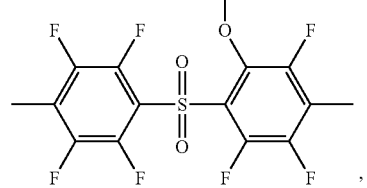
,
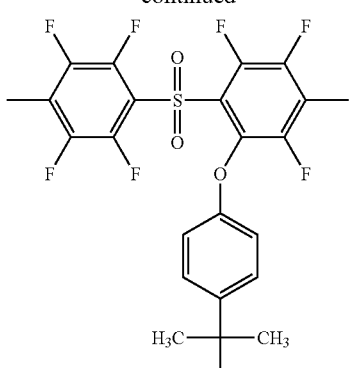
,
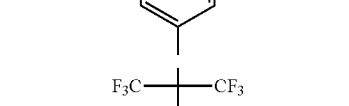
,

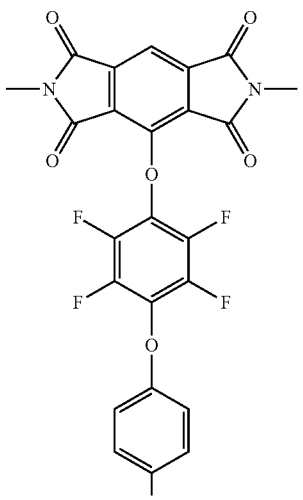

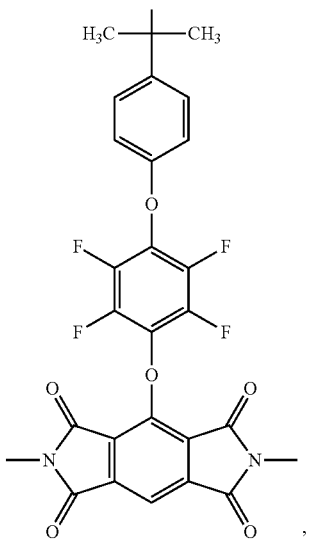

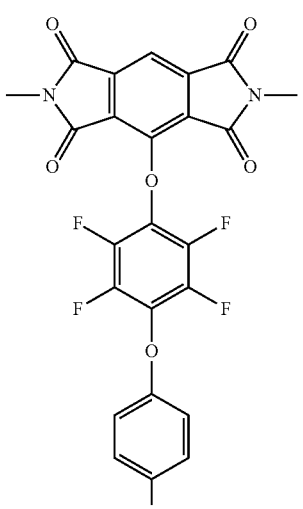

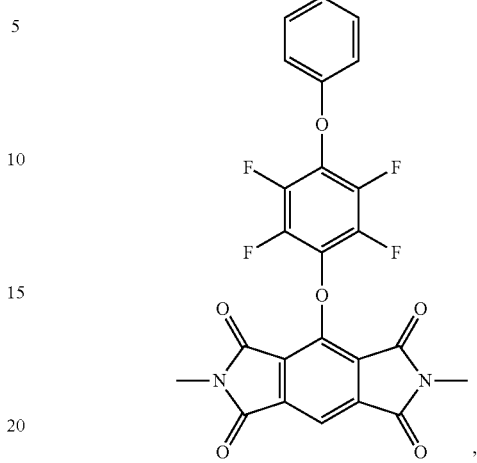

or the mixtures thereof.

The cross linked product includes a fluorinated polyimide group containing a fluoro-pendant group in the amount of from about 50 weight percent to about 95 weight percent of the total solids of the FPI fibers. The crosslinking agent comprises from about 1 weight percent to about 15 weight percent of the total solids the FPI fibers. The active site comprises from about 0.5 weight percent to about 50 weight percent of the total solids of the FPI fiber.

Examples of fluoropolymers useful as the sheath or coating of the membrane include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known commercially under various designations such as VITON A®, VITON B®, VITON E®, VITON E 60C®, VITON E430® VITON 910® VITON GH®; VITON GF®; and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Solvay Solexis.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

Examples of fluoropolymers useful as the sheath or coating of the membrane include fluoroplastics. Fluoroplastics suitable for use herein include fluoropolymers comprising a monomeric repeat unit that is selected from the group consisting of vinylidene fluoride, hexafluoropropylene, tetrafluoroethylene, perfluoroalkylvinylether, and mixtures thereof. Examples of fluoroplastics include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof.

While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature may be combined with one or more other features of the other implementations as may be desired and advantageous for any given or particular function.

EXAMPLES

Figure 2:
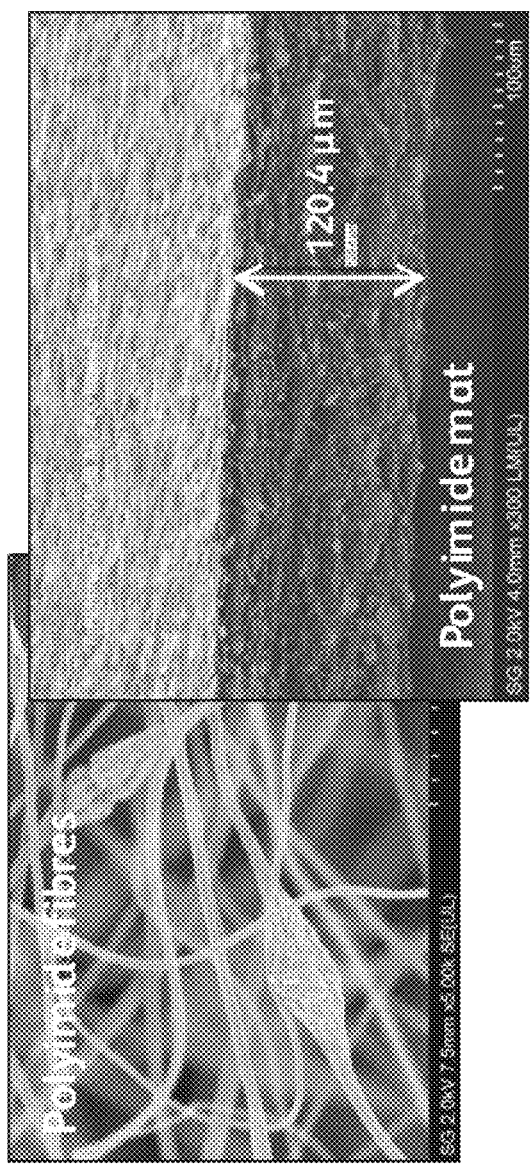
FIG. 2 shows photographs of fluorinated polyimide (FPI) fibers and a mat fabricated from the fluorinated polyimide fibers.

Electrospun FPI fabrics with the fiber sizes ranging from 300 nm to 1 μm were fabricated. The structure of the FPI fibers are shown below. The operating conditions, i.e. voltages (8-20 k), solution concentration (about 5 weight percent to about 20 weight percent FPI in dimethylacetamide), flow rate (0.7-1.4 mL/h), distance between the needle and collector (10-20 cm), and needle size (0.5-1 micron) were varied to obtain the fibers with desired sizes. Uniform, non-woven fabric mats were achieved with a range of thickness (about 20 μm to about 120 μm) and high porosity. Photographs of the FPI fibers and a polyimide mat are shown in FIG. 2. The FPI fabric mats were treated with perfluoropolymers (i.e. Teflon AF2400 and Fluorolink S10) to further reduce the surface energy. The FPI fabric mat was immersed in Teflon AF2400 solution (available from DuPont) or 2 weight percent solution of Fluorolink S10 in IPA (isopropyl alcohol). The excess solution was removed by padding. The treated fabric mat was heated at 340° C. for AF2400 sample and 250° C. for Fluorolink S10 sample. The treated FPI mats possess superhydrophobicity with dynamic behaviour of water droplets and sustained oleophobicity at elevated temperatures (e.g. stable paraffin oil drop at 150° C. for days). The solid-ink contact angle measured ranges from 100 degrees to about 127 degrees at 120° C.

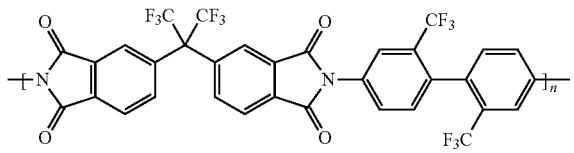

Structure of FPI Fibers

Figure 3:
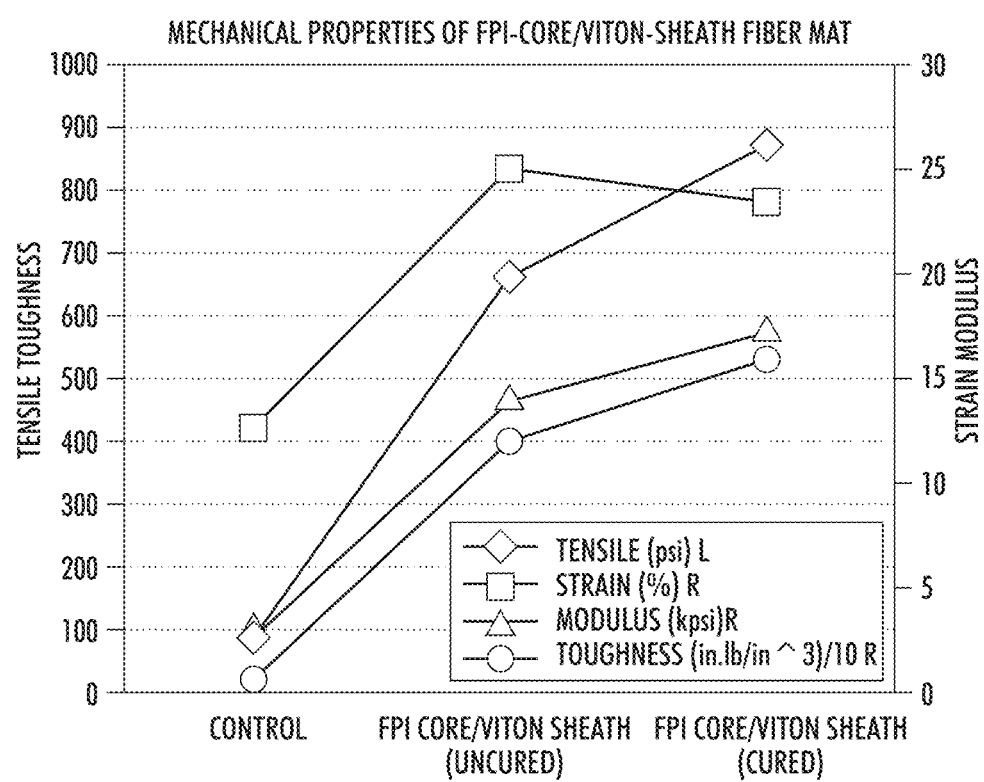
FIG. 3 shows properties of a FPI/Viton core sheath fiber mat.

Compared to the FPI fiber mat, the core-sheath FPI/Viton fabric mat showed improved mechanical properties (FIG. 3) and enhanced compatibility with the perfluoropolymer to facilitate further surface treatment.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A membrane comprising:
a plurality of electrospun polyimide fibers encased in an electrospun fluoroelastomer sheath, wherein the fluoroelastomer sheath has a curing temperature of from about 150° C. to about 360° C., the plurality of fibers having a diameter of from about 10 nm to about 50 microns, wherein the plurality of fibers form a permeable mat wherein the polyimide fibers are represented by

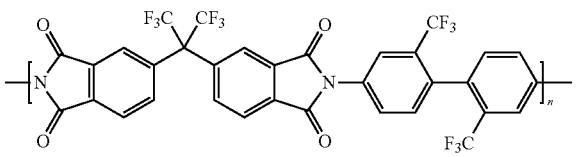

wherein n is from about 30 to about 500.

2. The membrane according to claim 1, wherein said fluoroelastomer sheath comprises a fluoroelastomer selected from the group consisting of copolymers of vinylidenefluoride, hexafluoropropylene and tetrafluoropropylene and tetrafluoroethylene, terpolymers of vinylidenefluoride, hexafluoropropylene and tetrafluoroethylene, tetrapolymers of vinylidenefluoride, hexafluoropropylene, tetrafluoroethylene, and a cure site monomer.

3. The membrane according to claim 1, wherein the permeable mat further comprises a pore size of from about 5 nm to about 50 μm.

4. The membrane according to claim 1, wherein the electrospun fluoropolymer sheath further comprises a thickness of from about 5 microns to about 5 mm.

5. The membrane according to claim 1, further comprising an oil contact angle of larger than about 90 degrees at a temperature above about 100° C.

6. The membrane according to claim 1, wherein the permeable mat further comprises an elastic modulus of from about 5 kpsi to about 100 kpsi.

7. The membrane according to claim 1, wherein said permeable mat comprise a tensile strength of from about 400 psi to about 1500 psi.

8. A membrane comprising:
a plurality of electrospun polyimide fibers encased in an electrospun fluoroelastomer sheath, the plurality of fibers having a diameter of from about 100 nm to about 1 microns, wherein the plurality of fibers form a permeable mat and wherein the mat comprises an oil contact angle of larger than about 90 degrees at a temperature above about 100° C. wherein the polyimide fibers are represented by

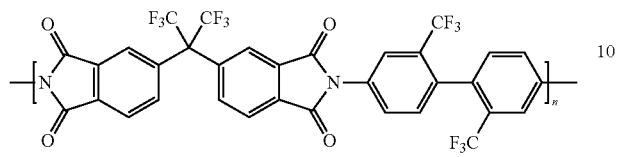

wherein n is from about 30 to about 500.

9. The membrane according to claim 8, wherein the permeable mat has a pore size of from about 5 nm to about 50 gm.

10. The membrane according to claim 8, wherein the electrospun fluoroelastomer sheath further comprises a thickness of from about 5 microns to about 5 mm.

11. The membrane according to claim 8, wherein the permeable mat further comprises an elastic modulus of from about 5 kpsi to about 100 kpsi.

12. The membrane according to claim 8, wherein the permeable mat comprise a tensile strength of from about 400 psi to about 1500 psi.

* * * * *